United States Patent
Chen

(10) Patent No.: US 7,187,531 B1
(45) Date of Patent: Mar. 6, 2007

(54) TRANSIENT SUPPRESSOR AND POWER CONVERTER EMPLOYING THE SAME

(75) Inventor: Daoshen Chen, Sunnyvale, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 895 days.

(21) Appl. No.: 10/393,166

(22) Filed: Mar. 20, 2003

(51) Int. Cl.
*H02H 3/22* (2006.01)
*H02H 7/125* (2006.01)

(52) U.S. Cl. ........................ 361/111; 363/53
(58) Field of Classification Search ................ 361/111; 363/126, 125, 17
See application file for complete search history.

(56) References Cited

U.S. PATENT DOCUMENTS

| | | | |
|---|---|---|---|
| 5,351,179 A * | 9/1994 | Tsai et al. ................. | 363/53 |
| 5,731,966 A * | 3/1998 | Liu .......................... | 363/53 |
| 5,973,939 A * | 10/1999 | Tan ......................... | 363/21.06 |
| 6,121,756 A * | 9/2000 | Johnson et al. ............ | 320/140 |
| 6,542,385 B1 * | 4/2003 | Emmons et al. ........... | 363/17 |

FOREIGN PATENT DOCUMENTS

JP            60031624 A  *  2/1985

OTHER PUBLICATIONS

"High-Voltage, High-Power, ZVS, Full-Bridge PWM Converter Employing an Active Snubber" by J.A. Sabate, et al.; Proc. IEEE Applied Power Electronics Conf.; pp. 158-163.
"Snubber Circuits: Theory, Design and Application" by Philip C. Todd; May 1993; Unitrode Power Suply design Seminar Note; pp. 2-1-2-15.
"A 1 kW, 500 kHz Front-End Converter for a Distributed Power Supply System" by Loveday H. Mweene, et al.; Proc. IEEE Applied Power Electronics Conf., 1989; pp. 423-432.

* cited by examiner

*Primary Examiner*—Brian Sircus
*Assistant Examiner*—Boris Benenson

(57) ABSTRACT

The present invention is directed to a transient suppressor, a method of suppressing a peak voltage associated with a rectifier, and a power converter employing the same. In one embodiment, the transient suppressor includes a saturable reactor circuit interposed between a rectifier and a transformer winding. The transient suppressor also includes a RC circuit, coupled between the rectifier and the saturable reactor circuit and across the transformer winding, configured to cooperate with the saturable reactor circuit to suppress a peak voltage associated with the rectifier.

20 Claims, 2 Drawing Sheets

TRANSIENT SUPPRESSOR AND POWER CONVERTER EMPLOYING THE SAME

TECHNICAL FIELD OF THE INVENTION

The present invention is directed, in general, to power electronics and, more specifically, to a transient suppressor, a method of suppressing a peak voltage associated with a rectifier, and a power converter employing the same.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter, an input/output isolation transformer and a rectifier on a secondary side of the isolation transformer. The inverter generally includes a switching device, such as a field effect transistor ("FET"), that converts the DC input voltage to an AC voltage. The input/output isolation transformer, then, transforms the AC voltage to another value and the rectifier generates the desired DC voltage at the output of the converter. Conventionally, the rectifier includes a plurality of rectifying diodes that conduct the load current only when forward-biased in response to the input waveform to the rectifier.

Unfortunately, rectifying diodes suffer from a reverse recovery condition when there is a transition from a conduction stage to a non-conduction stage. During the reverse recovery condition, the current through the diodes reverse direction, causing excess energy to be stored in the leakage inductance of an isolation transformer and power to be lost in the diodes. The energy stored in the leakage inductance is dissipated in a resonant manner with the junction capacitance of the rectifying diode, causing oscillation (or ringing) and overshoot in the voltage waveform of the rectifying diode. As a result, the converter suffers efficiency losses that impair the overall performance of the converter. Therefore, efforts to minimize the losses associated with the rectifier and, more specifically, with the rectifying diodes will improve the overall performance of the converter.

A traditional manner to reduce the losses associated with the rectifying diodes is to introduce a snubber circuit coupled to the rectifying diodes. For instance, a resistor-capacitor-diode (RCD) snubber circuit is disclosed in "A 1 kW, 500 kHz Front-End Converter for a Distributed Power Supply System", by L. H. Mweene et al., Proc. IEEE Applied Power Electronics Conf., p. 423–432 (1989), which is incorporated herein by reference. The RCD snubber circuit not only damps out oscillations in the rectifier's diode voltage, but also recovers a portion of the energy stored in the snubber capacitor to the output. During each switching transient, the reverse recovery energy due to the recovery process of the diodes is first stored in the snubber capacitor followed by a transfer of the energy to the output through the snubber resistor. During this process, some power is dissipated in the snubber resistor. As the output power increases, the power dissipated in the snubber resistor becomes significant thereby limiting the RCD snubber to lower power applications.

To reduce the power loss in the snubber resistor, a lossless snubber circuit is proposed in "High-Voltage, High-Power, ZVS, Full-Bridge PWM Converter Employing an Active Snubber" by J. A. Sabaste et al., 1991 VEPC Seminar Proc., pp. 125–130, which is incorporated herein by reference. This circuit operates in the same way as a RCD snubber circuit, except that the energy taken into the snubber circuit is recovered to an auxiliary inductor through the oscillation between the auxiliary inductor and the lossless snubber capacitor, after an auxiliary switch is turned on. However, the snubber circuit will lose its effectiveness if the converter is operated at very small duty ratio, resulting in insufficient time to discharge the energy stored in the snubber circuit.

An alternative approach is to employ a saturable reactor snubber circuit in series with the rectifying diode. The saturable reactor normally has an amorphous core that has the capability of being able to transition between low impedance (i.e., saturation) and high impedance with relatively low core losses. Therefore, when the rectifying diode is conducting, the reactor (in saturation) provides low impedance thereby allowing the current to flow freely. However, when the rectifying diode transitions from conduction to non-conduction stage and the reverse recovery condition occurs, the reactor provides a high impedance thereby reducing the reverse current flow. The saturable reactor has to be cooled by forced air, otherwise the reactor will run too hot. When applied to natural convection cooling power supplies, the temperature rise (e.g., up to 1200 Celsius) may not be acceptable.

Yet another alternative approach to manage the losses associated with the reverse recovery condition is to employ a clamp circuit coupled to the rectifying diodes as disclosed in "Snubber circuits: Theory, Design and Application", by Philip C. Todd, Unitrode Power Supply Design Seminar Note, p. 2–1, 2–15 (1993), which is also incorporated herein by reference. The clamp circuit disclosed in Todd limits the peak voltage and reduces the stress across components within the converter. An advantage associated with such a circuit is that a clamp circuit does not dissipate energy in the converter.

Unfortunately, the clamp circuit introduced in Todd is generally limited to applications wherein the output voltage of the converter is fixed. Modifications can be made to the clamp circuit, however, to make it independent of the output voltage. For example, a coupling transformer may be connected across the main transformer effectively recovering excess transient energy to the primary side of the transformer. An impediment to the use of such a circuit is that the coupling transformer of the clamp circuit is generally comparable in size to the main transformer due to the large volts-second of the main transformer.

Accordingly, what is needed in the art is a circuit for a rectifier that suppresses a peak voltage associated with, for instance, the reverse recovery condition to thereby reduce the power losses associated with the rectifier.

SUMMARY OF THE INVENTION

To address the above-discussed deficiencies of the prior art, the present invention is directed to a transient suppressor for use with a rectifier. In one embodiment, the transient suppressor includes a saturable reactor circuit interposed between the rectifier and a transformer winding. The transient suppressor also includes an RC circuit, coupled between the rectifier and the saturable reactor circuit and across the transformer winding, configured to cooperate with the saturable reactor circuit to suppress a peak voltage associated with the rectifier.

In another aspect, the present invention provides a method of suppressing a peak voltage associated with a rectifier coupled to a transformer winding. In one embodiment, the method includes blocking at least a portion of a reverse recovery current associated with the rectifier by allowing a blocking voltage to build across a saturable reactor circuit. The method also includes moderating the blocking voltage with a RC circuit thereby suppressing a peak voltage associated with the rectifier.

In yet another embodiment, the present invention provides a power converter including a transformer having a primary winding and a secondary winding, and a primary circuit coupled to the primary winding. The power converter also includes a rectifier coupled to an output filter circuit, and a transient suppressor coupled between the rectifier and the secondary winding. The transient suppressor includes a saturable reactor circuit interposed between the rectifier and the secondary winding. The transient suppressor also includes a RC circuit, coupled across the secondary winding, that cooperate with the saturable reactor circuit to suppress a peak voltage associated with the rectifier.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
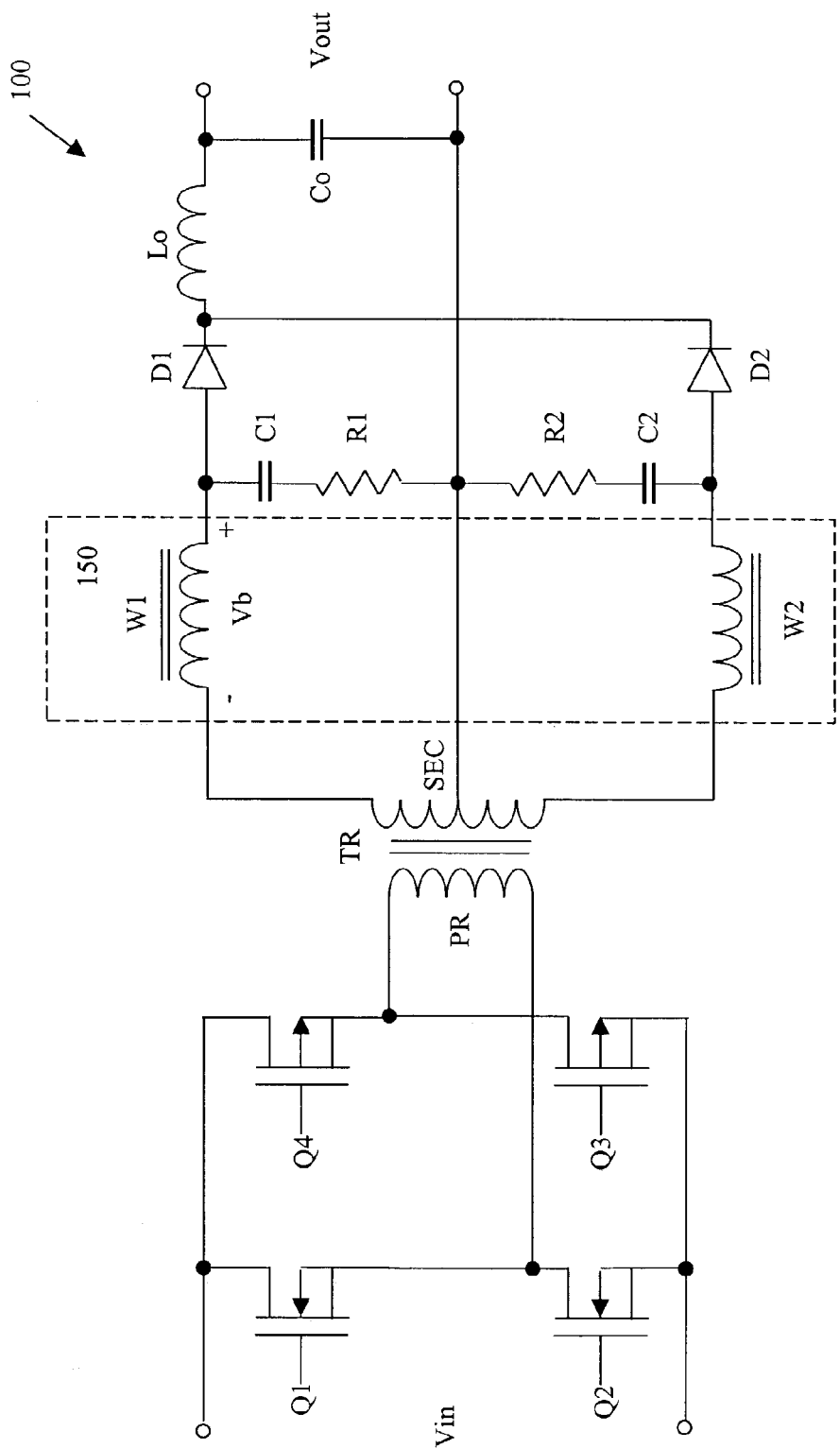
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. While the power converter 100 in the illustrated embodiment employs a full-bridge topology, other types of converter topologies are well within the broad scope of the present invention.

The power converter 100 is coupled to a source of electrical power and provides an output voltage Vout to a load coupled to an output thereof. The power converter 100 includes a transformer TR having a primary winding PR and a center tapped secondary winding SEC. The power converter 100 also includes a primary circuit having first, second, third and fourth switches Q1, Q2, Q3, Q4 controllable by a control circuit (not shown) to transfer power from the source of electrical power to the load. The power converter 100 also includes a rectifier having first and second rectifying diodes D1, D2 and an output filter circuit having an output filter inductor Lo and filter capacitor Co.

The power converter 100 still further includes a transient suppressor 150 having a saturable reactor circuit and a RC circuit. In the illustrated embodiment, the saturable reactor circuit includes first and second windings (also referred to as first and second saturable reactor windings W1, W2) coupled to the first and second rectifying diodes D1, D2, respectively. The RC circuit includes a first resistor R1 series-coupled to a first capacitor C1 and a second resistor R2 series-coupled to a second capacitor C2.

In an exemplary operating mode, the power converter 100 generally operates as set forth below. The first, second, third and fourth switches Q1, Q2, Q3, Q4 are arranged in two diagonal pairs that are alternately turned on for a fraction of a switching period to apply opposite polarities of an input voltage Vin across the primary winding PR of the transformer TR. Thus, the switches Q1, Q2, Q3, Q4 operate to convert the input voltage Vin into an AC voltage to properly operate the transformer TR. Between conduction intervals of the diagonal pairs, all the switches Q1, Q2, Q3, Q4 are turned off for a fraction of the switching period.

As will be described in more detail below, the rectifier then rectifies the AC voltage delivered by the secondary winding SEC of the transformer TR. The output filter circuit decomposes the rectified voltage into AC and DC components. The DC component, which is generally fixed, is the output voltage Vout of the power converter 100. The control circuit, therefore, monitors the output voltage Vout and adjusts the duty ratio of the first, second, third and fourth switches Q1, Q2, Q3, Q4 to maintain the output voltage Vout at a substantially constant level as the input voltage Vin and load current changes.

Regarding the switching transitions, during a first interval, the first and third switches Q1, Q3 conduct to apply the input voltage Vin across the primary winding PR of the transformer TR. The first rectifying diode D1 is forward biased during this period to deliver a secondary current via the output filter circuit to the load. During a second interval, all the switches Q1, Q2, Q3, Q4 are turned off and, due to the current draw associated with the output filter inductor Lo, the first and second rectifying diodes D1, D2 are conducting during this period.

Then, during a third interval, the second and fourth switches Q2, Q4 conduct to apply a voltage (opposite in polarity to that of the first interval) across the primary winding PR of the transformer TR. Additionally, the first rectifying diode D1 is reversed biased and the second rectifying diode D2 delivers the secondary current via the output filter circuit to the load. The switches Q1, Q2, Q3, Q4 are then turned off during a fourth interval and, due to the current draw associated with the output filter inductor Lo, the first and second rectifying diodes D1, D2 are forward biased and conducting during this period. As the first interval commences again, the second rectifying diode D2 is reverse biased and the first rectifying diode D1 is forward biased to deliver the secondary current via the output filter circuit to the load.

As mentioned above, the first and second rectifying diodes D1, D2 suffer from a reverse recovery condition when there is a transition from a conduction stage to a non-conduction stage. During the reverse recovery condition, the current through the first and second rectifying diodes D1, D2 reverses direction, causing excess energy to be stored in the leakage inductance of the transformer TR and power to be lost in the rectifying diodes D1, D2. The energy stored in the leakage inductance is dissipated in a resonant manner with the junction capacitance of the rectifying diodes D1, D2, causing oscillation (or ringing) and overshoot in the voltage waveform thereof. As a result, the power converter 100 suffers efficiency losses that impair the overall performance thereof.

The transient suppressor 150 provides a circuit to reduce the deleterious effects of the reverse recovery condition and thereby the losses associated with the operation of the rectifier. The reverse recovery condition occurs when one of the first or second rectifying diodes D1, D2 is initially reverse biased. An internal diode storage charge, which occurs during the forward biased condition of the rectifying diode has to be discharged before the rectifying diode can turn-off. Discharging this internal diode storage charge during reverse recovery results in a reverse recovery current that flows in a direction opposite to the forward biased current. The oscillation and overshoot effects of the voltage waveform associated with this reverse recovery current are substantially ameliorated by the transient suppressor 150.

The first saturable reactor winding W1 is coupled to the first rectifying diode D1 and operates to block its reverse recovery current for a period of time. The attributes of the saturable reactor circuit are chosen to provide a number of volt-seconds of blocking time, which is proportional to an area of the BH curve (called a blocking area BA) associated with the saturable reactor circuit. This blocking area BA may be expressed by:

$$BA = K[(V_{rmax})(t_{rrmax})],$$

where $V_{rmax}$ is a maximum reverse voltage to be allowed across the first rectifying diode D1, $t_{rrmax}$ is a maximum reverse recovery time allowed for the first rectifying diode D1, and K is an empirically determined constant. The constant K may be chosen to provide a margin of safety for the blocking time wherein a value of two may be typical.

A blocking voltage $V_b$ builds across the first saturable reactor winding W1 (with the polarity shown in FIG. 1) while the reverse recovery current is flowing. When the reverse recovery current stops flowing (i.e., the internal diode storage charge has substantially dissipated), the blocking voltage $V_b$ would tend to increase rapidly. However, the first resistor R1 series-coupled to the first capacitor C1 supplies current to moderate this increase thereby dampening or suppressing a peak voltage associated with the first rectifying diode D1 being turned off. Analogously, the second saturable reactor winding W2 coupled to the second rectifying diode D2 and the second resistor R2 series-coupled to the second capacitor C2 operate in a similar manner. In an alternative embodiment, the first and second reactor windings W1, W2 may be employed in separate saturable reactor cores.

Figure 2:
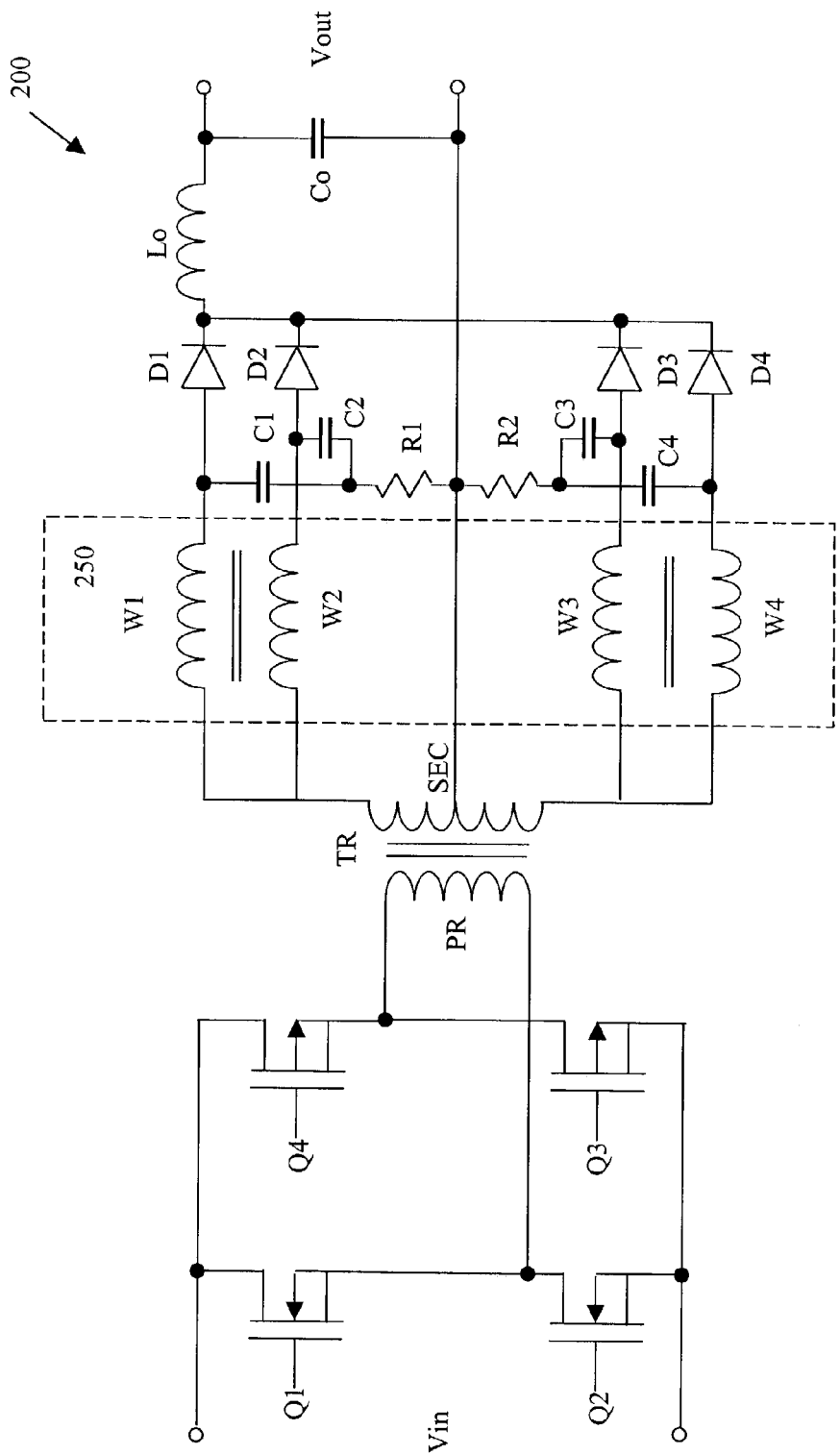
FIG. 2 illustrates a schematic diagram of another embodiment of a power converter constructed according to the principles of the present invention.

Turning now to FIG. 2, illustrated is a schematic diagram of another embodiment of a power converter 200 constructed according to the principles of the present invention. Analogous to the power converter 100 of FIG. 1, the power converter 200 in the illustrated embodiment employs a full-bridge topology. The power converter 200 is coupled to a source of electrical power and provides an output voltage Vout to a load coupled to an output thereof. The power converter 200 includes a transformer TR having a primary winding PR and a center tapped secondary winding SEC. The power converter 200 also includes a primary circuit having first, second, third and fourth switches Q1, Q2, Q3, Q4 controllable by a control circuit (not shown) to transfer power from the source of electrical power to the load. The power converter 200 also includes a rectifier having first, second, third and fourth rectifying diodes D1, D2, D3, D4, and an output filter circuit having an output filter inductor Lo and filter capacitor Co.

The power converter 200 still further includes a transient suppressor 250 having a saturable reactor circuit and a RC circuit. In the illustrated embodiment, the saturable reactor circuit includes first, second, third and fourth windings (also referred to as first, second, third and fourth saturable reactor windings W1, W2, W3, W4) coupled to ones of the first, second, third and fourth rectifying diodes D1, D2, D3, D4. In the illustrated embodiment, the RC circuit includes a first resistor R1 coupled to first and second capacitors C1, C2 and a second resistor R2 coupled to third and fourth capacitors C3, C4. In an alternative embodiment, the RC circuit may include a first capacitor C1 coupled to first and second resistors R1, R2 and a second capacitor C2 coupled to third and fourth resistors R3, R4.

In an exemplary operating mode and analogous to the operation of the power converter 100 described with respect to FIG. 1, the power converter 200 generally operates as set forth below. The first, second, third and fourth switches Q1, Q2, Q3, Q4 are arranged in two diagonal pairs that are alternately turned on for a fraction of a switching period to apply opposite polarities of an input voltage Vin across the primary winding PR of the transformer TR. Thus, the switches Q1, Q2, Q3, Q4 operate to convert the input voltage Vin into an AC voltage to properly operate the transformer TR. Between conduction intervals of the diagonal pairs, all the switches Q1, Q2, Q3, Q4 are turned off for a fraction of the switching period.

As will be described in more detail below, the rectifier then rectifies the AC voltage delivered by the secondary winding SEC of the transformer TR. The output filter circuit decomposes the rectified voltage into AC and DC components. The DC component, which is generally fixed, is the output voltage Vout of the power converter 200. The control circuit, therefore, monitors the output voltage Vout and adjusts the duty ratio of the first, second, third and fourth switches Q1, Q2, Q3, Q4 to maintain the output voltage Vout at a substantially constant level as the input voltage Vin and load current changes.

Regarding the switching transitions, during a first interval, the first and third switches Q1, Q3 conduct to apply the input voltage Vin across the primary winding PR of the transformer TR. The first and second rectifying diodes D1, D2 are forward biased during this period to deliver a secondary current via the output filter circuit to the load. During a second interval, all the switches Q1, Q2, Q3, Q$ are turned off and, due to the current draw associated with the output filter inductor Lo, the first, second, third and fourth rectifying diodes D1, D2, D3, D4 are forward biased and conducting during this period.

Then, during a third interval, the second and fourth switches Q2, Q4 conduct to apply a voltage (opposite in polarity to that of the first interval) across the primary winding PR of the transformer TR. Additionally, the first and second rectifying diodes D1, D2 are reversed biased and the third and fourth rectifying diodes D3, D4 deliver the secondary current via the output filter circuit to the load. The switches Q1, Q2, Q3, Q4 are then turned off during a fourth interval and, due to the current draw associated with the output filter inductor Lo, the first, second, third and fourth rectifying diodes D1, D2, D3, D4 are forward biased and conducting during this period. As the first interval commences again, the third and fourth rectifying diodes D3, D4 are reverse biased and the first and second rectifying diodes D1, D2 are forward biased to deliver the secondary current via the output filter circuit to the load.

As mentioned above, the first, second, third and fourth rectifying diodes D1, D2, D3, D4 suffer from a reverse recovery condition when there is a transition from a conduction stage to a non-conduction stage. During the reverse recovery condition, the current through the first, second, third and fourth rectifying diodes D1, D2, D3, D4 reverses direction, causing excess energy to be stored in the leakage inductance of the transformer TR and power to be lost in the rectifying diodes D1, D2, D3, D4. The energy stored in the leakage inductance is dissipated in a resonant manner with the junction capacitance of the rectifying diodes D1, D2, D3, D4, causing oscillation (or ringing) and overshoot in the voltage waveform thereof. As a result, the power converter 200 suffers efficiency losses that impair the overall performance thereof.

The transient suppressor 250 provides a circuit to reduce the deleterious effects of the reverse recovery condition and thereby the losses associated with the operation of the rectifier. The operation of the transient suppressor 250 is analogous to that of the transient suppressor 150 as was described with respect to FIG. 1. The first and second saturable reactor windings W1, W2 provide blocking voltages for the first and second rectifier diodes D1, D2, respectively. The first and second capacitors C1, C2 coupled to the first resistor R1 respectively serve to dampen or suppress a resulting peak voltage associated with the first and second rectifier diodes D1, D2 as they become turned off. The common first resistor R1 provides a measure of feedback between the first and second rectifier diodes D1, D2, thereby allowing a more balanced overall voltage suppression.

Analogously, the third and fourth saturable reactor windings W3, W4 coupled to the third and fourth rectifying diodes D3, D4 and the second resistor R2 series-coupled to the third and fourth capacitors C3, C4 operate in a similar manner. In an alternative embodiment, the first, second, third and fourth reactor windings W1, W2, W3, W4 may be employed in separate saturable reactor cores.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies. For a better understanding of a variety of power converter topologies, see *Modern DC-to-DC Switchmode Power Converter Circuits*, by Rudolph P. Severns and Gordon Bloom, Van Nostrand Reinhold Company, New York, N.Y. (1985) and *Principles of Power Electronics*, by J. G. Kassakian, M. F. Schlecht and G. C. Verghese, Addison-Wesley (1991), which are incorporated herein by reference.

In summary, embodiments of a transient suppressor, a method of suppressing a peak voltage and a power converter employing the same have been presented. The transient suppressor and method generally provide benefits of a reduction in overshoot voltage on the output rectifier, reduced electromagnetic interference (EMI) and improved thermal performance. The overshoot voltage may typically be less than five percent thereby allowing a less-expensive 200 volt rectifier to be employed for an output voltage of 48 volts instead of a more costly 300 volt rectifier. The reduced overshoot also provides less EMI since overshoot is reduced and ringing is substantially eliminate. Additionally, compared to a more traditional circuit, the operating temperature of the transient suppressor may be reduced by about 10 degrees C.

Although the present invention has been described in detail, those skilled in the art should understand that they can make various changes, substitutions and alterations herein without departing from the spirit and scope of the invention in its broadest form.

What is claimed is:

1. A transient suppressor for use with a rectifier coupled to a transformer winding, comprising:
    a saturable reactor circuit interposed between said rectifier and said transformer winding; and
    a RC circuit, coupled between said rectifier and said saturable reactor circuit and across said transformer winding, configured to cooperate with said saturable reactor circuit to suppress a peak voltage associated with said rectifier.

2. The transient suppressor as recited in claim 1 wherein said RC circuit includes a series coupled resistor and capacitor.

3. The transient suppressor as recited in claim 1 wherein said rectifier includes a plurality of rectifying diodes.

4. The transient suppressor as recited in claim 1 wherein said saturable reactor circuit includes a plurality of windings.

5. The transient suppressor as recited in claim 1 wherein said RC circuit includes a resistor and a plurality of capacitors.

6. The transient suppressor as recited in claim 1 wherein said RC circuit includes a capacitor and a plurality of resistors.

7. The transient suppressor as recited in claim 1 wherein said transformer winding is a secondary winding.

8. A method of suppressing a peak voltage associated with a rectifier coupled to a transformer winding, comprising:
    blocking at least a portion of a reverse recovery current associated with said rectifier by allowing a blocking voltage to build across a saturable reactor circuit; and
    moderating said blocking voltage with a RC circuit thereby suppressing a peak voltage associated with said rectifier.

9. The method as recited in claim 8 wherein said RC circuit includes a series coupled resistor and capacitor.

10. The method as recited in claim 8 wherein said rectifier includes a plurality of rectifying diodes.

11. The method as recited in claim 10 wherein said saturable reactor circuit includes a plurality of windings.

12. The method as recited in claim 11 wherein said RC circuit includes a resistor and a plurality of capacitors.

13. The method as recited in claim 11 wherein said RC circuit includes a capacitor and a plurality of resistors.

14. The method as recited in claim 8 wherein said transformer winding is a secondary winding.

15. A power converter; comprising:
    a transformer having a primary winding and a secondary winding;
    a primary circuit coupled to said primary winding;
    a rectifier coupled to an output filter circuit; and
    a transient suppressor coupled between said rectifier and said secondary winding, including:
        a saturable reactor circuit interposed between said rectifier and said secondary winding; and
        a RC circuit, coupled across said secondary winding, that cooperate with said saturable reactor circuit to suppress a peak voltage associated with said rectifier.

16. The power converter as recited in claim 15 wherein said RC circuit includes a plurality of series coupled resistors and capacitors.

17. The power converter as recited in claim 15 wherein said rectifier includes a plurality of rectifying diodes.

18. The power converter as recited in claim 15 wherein said saturable reactor circuit includes a plurality of windings.

19. The power converter as recited in claim 15 wherein said RC circuit includes a resistor and a plurality of capacitors.

20. The power converter as recited in claim 15 wherein said RC circuit includes a capacitor and a plurality of resistors.

* * * * *